(12) United States Patent
Chu et al.

(10) Patent No.: US 9,759,311 B2
(45) Date of Patent: Sep. 12, 2017

(54) BALL SCREW DEVICE

(71) Applicant: Hiwin Technologies Corp., Taichung (TW)

(72) Inventors: Wei Ying Chu, Taichung (TW); Yen Ying Sung, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 0 days.

(21) Appl. No.: 14/642,817

(22) Filed: Mar. 10, 2015

(65) Prior Publication Data

US 2015/0377342 A1    Dec. 31, 2015

(30) Foreign Application Priority Data

Jun. 25, 2014    (TW) .............................. 103121795 A

(51) Int. Cl.

| F16H 1/24 | (2006.01) |
|---|---|
| F16H 57/04 | (2010.01) |
| C10M 169/02 | (2006.01) |
| F16H 25/22 | (2006.01) |

(52) U.S. Cl.
CPC ....... *F16H 57/0497* (2013.01); *C10M 169/02* (2013.01); *F16H 57/045* (2013.01); *F16H 57/0406* (2013.01); *F16H 57/0464* (2013.01); *C10M 2203/1006* (2013.01); *C10M 2205/166* (2013.01); *C10N 2220/022* (2013.01); *C10N 2240/04* (2013.01); *C10N 2250/08* (2013.01); *C10N 2250/10* (2013.01); *F16H 25/2204* (2013.01); *F16H 57/0431* (2013.01)

(58) Field of Classification Search
CPC .. F16H 25/20; F16H 57/0497; F16H 25/2418; F16H 25/2219; F16H 25/2214
USPC ....... 74/89.44, 89.3, 89.15, 424.8 R; 184/19, 184/102
See application file for complete search history.

(56) References Cited

U.S. PATENT DOCUMENTS

| 5,782,135 A | 7/1998 | Kondo et al. |
|---|---|---|
| 6,015,775 A | 1/2000 | Takayama et al. |
| 6,068,931 A | 5/2000 | Adam et al. |
| 6,247,556 B1* | 6/2001 | Chen .................. F16H 25/2204 184/102 |
| 7,234,368 B1* | 6/2007 | Lin ..................... F16H 25/2214 74/424.83 |
| 7,788,987 B2* | 9/2010 | Chen .................. F16H 57/0406 74/89.44 |
| 8,387,474 B2* | 3/2013 | Lin ..................... F16C 29/0647 74/467 |

(Continued)

*Primary Examiner* — Zakaria Elahmadi
(74) *Attorney, Agent, or Firm* — Charles E. Baxley

(57) ABSTRACT

A ball screw device includes an elongated shaft having an outer groove, a ball nut having a screw hole for receiving the elongated shaft and having a passage communicating with the screw hole of the ball nut, and a lubricating device includes an inner cylindrical element engaged onto the elongated shaft and secured to the ball nut, a housing attached onto the cylindrical element and contacted with the ball nut, and the housing includes a chamber for receiving a lubricating grease, an oil distributing member is engaged into the passage of the ball nut and engaged into the screw hole of the ball nut for engaging with the elongated shaft, and an inner element is engaged in the housing and engaged with the distributing member for supplying the lubricating grease to the distributing member.

2 Claims, 4 Drawing Sheets

(56) References Cited

U.S. PATENT DOCUMENTS

| | | | |
|---|---|---|---|
| 8,931,358 B2* | 1/2015 | Chang | F16H 57/0406 184/19 |
| 2002/0056330 A1* | 5/2002 | Nishide | F16H 57/0497 74/89.44 |
| 2005/0252324 A1* | 11/2005 | Kato | F16H 25/2204 74/89.44 |
| 2006/0169075 A1* | 8/2006 | Chuo | F16H 57/0497 74/89.44 |
| 2009/0071278 A1* | 3/2009 | Chiu | F16H 25/2204 74/424.82 |
| 2009/0133520 A1* | 5/2009 | Chen | F16H 57/0497 74/89.44 |
| 2011/0146430 A1* | 6/2011 | Chen | F16H 57/0497 74/89.44 |
| 2012/0240706 A1* | 9/2012 | Ohkubo | F16H 25/2418 74/424.83 |
| 2012/0266703 A1* | 10/2012 | Chuo | F16H 57/0497 74/89.44 |
| 2013/0081490 A1* | 4/2013 | Chiang | F16N 9/00 74/89.44 |
| 2013/0112503 A1* | 5/2013 | Lin | F16N 39/04 184/6.22 |

* cited by examiner

BALL SCREW DEVICE

BACKGROUND OF THE INVENTION

1. Field of the Invention

The present invention relates to a ball screw device or motion guide apparatus, and more particularly to a ball screw device or motion guide apparatus including a lubricating device attached to a movable nut member for applying a lubricating grease or oil onto the movable nut member and for suitably lubricating the movable nut member, and including a structure for suitably heating the lubricating grease or oil and for allowing the lubricating grease or oil to be easily filled or applied to the required position of the movable nut member.

2. Description of the Prior Art

Typical ball screw devices or linear motion guide apparatuses comprise a movable member, such as a movable nut member rotatably or movably engaged onto the longitudinal screw shaft and movable relative to each other, and a number of ball bearing elements disposed between the movable nut member and the screw shaft for facilitating the sliding movement between the movable nut member and the screw shaft.

For example, U.S. Pat. No. 5,782,135 to Kondo et al. discloses one of the typical ball screw devices comprising a ball nut pivotally or rotatably coupled onto a screw shaft, and a number of loaded ball bearing elements disposed between the screw shaft and the ball nut for facilitating the sliding movement between the screw shaft and the ball nut, and a number of non-loaded balls disposed between the loaded ball bearing elements and made of lubricating materials for suitably lubricating the loaded ball bearing elements and the screw shaft and the ball nut.

However, after use, the non-loaded balls will be worn out and will have a reduced outer diameter such that the gaps between the loaded ball bearing elements will be greatly increased and such that the screw shaft and the ball nut may not be suitably pivoted or rotated relative to each other.

U.S. Pat. No. 6,015,775 to Takayama et al., and U.S. Pat. No. 6,068,931 to Adam et al. disclose two further typical self-lubricating sliding or bearing materials made of specially designed or selected elements for suitably lubricating two movable or rotatable or slidable members.

However, the specially designed or selected elements may greatly increase the manufacturing costs for the sliding or bearing materials.

U.S. Pat. No. 7,234,368 to Lin et al. discloses a further typical ball screw device comprising a ball nut pivotally or rotatably coupled onto a screw shaft, and a number of ball bearing elements disposed between the screw shaft and the ball nut for facilitating the sliding movement between the screw shaft and the ball nut, and one or more guide members engaged in the helical groove portions of the screw shaft and each having an oil retaining member for applying the oil onto the screw shaft.

However, the ball nut should be specially designed and machined for fitting or mounting the guide members such that the manufacturing procedures for the typical ball screw device will be complicated and such that the manufacturing costs for the typical ball screw device will be greatly increased. In addition, the typical ball screw devices failed to disclose a heating device for suitably heating the lubricating grease or oil and for allowing the lubricating grease or oil to be easily filled or applied to the required position of the screw shaft and the movable nut member.

U.S. Pat. No. 8,387,474 to Lin et al. discloses a further typical ball screw device comprising a ball nut pivotally or rotatably coupled onto a screw shaft, and a number of ball bearing elements disposed between the screw shaft and the ball nut for facilitating the sliding movement between the screw shaft and the ball nut, and a lubricating device attached to the ball nut for applying a lubricating grease or oil onto the ball nut and for suitably lubricating the movable nut members.

However, the typical screw devices have no heating devices for heating the lubricating grease or oil such that the lubricating grease or oil may not be suitably applied to the screw shaft and the ball nut.

The present invention has arisen to mitigate and/or obviate the afore-described disadvantages of the conventional ball screw devices or motion guide apparatuses.

SUMMARY OF THE INVENTION

The primary objective of the present invention is to provide a ball screw device including a lubricating device attached to a movable nut member for applying a lubricating grease or oil onto the movable nut member and for suitably lubricating the movable nut member, and including a structure for suitably heating the lubricating grease or oil and for allowing the lubricating grease or oil to be easily filled or applied to the required position of the movable nut member.

In accordance with one aspect of the invention, there is provided a ball screw device comprising an elongated shaft including a groove formed on an outer peripheral surface thereof, a ball nut including a screw hole formed therein for receiving the elongated shaft, the ball nut including a passage formed therein and communicating with the screw hole of the ball nut, and a lubricating device including an inner cylindrical element having a bore formed in the cylindrical element for receiving the elongated shaft, the cylindrical element including a first end portion secured to the ball nut and including a second end portion, a housing attached onto the cylindrical element and contacted with the ball nut, and the housing including a chamber formed therein for receiving a lubricating grease, an oil distributing member engaged into the passage of the ball nut and including a first end portion engaged into the screw hole of the ball nut for engaging with the groove of the elongated shaft, and an inner element engaged in the chamber of the housing for absorbing the lubricating grease, and the inner element including a first end portion engaged into the passage of the ball nut and engaged with the distributing member for supplying the lubricating grease to the distributing member, and then to the groove of the elongated shaft.

The ball nut includes an orifice formed therein and communicating with the passage of the ball nut, and the housing includes a mouth piece engaged into the orifice of the ball nut for anchoring the housing to the ball nut. The first end portion of the inner element is engaged through the mouth piece of the housing and engaged into the passage of the ball nut and contacted with the distributing member.

The ball nut includes a fastener threaded with the ball nut and engaged with the distributing member for retaining the distributing member within the passage of the ball nut. The lubricating device includes a lock nut engaged onto the cylindrical element and engaged with the housing for anchoring the housing between the ball nut and the lock nut.

The lubricating grease includes a wax of 5~30% by weight, and a lubricating oil of 70~95% by weight. It is preferable the lubricating grease includes the wax of 10% by weight, and the lubricating oil of 90% by weight.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
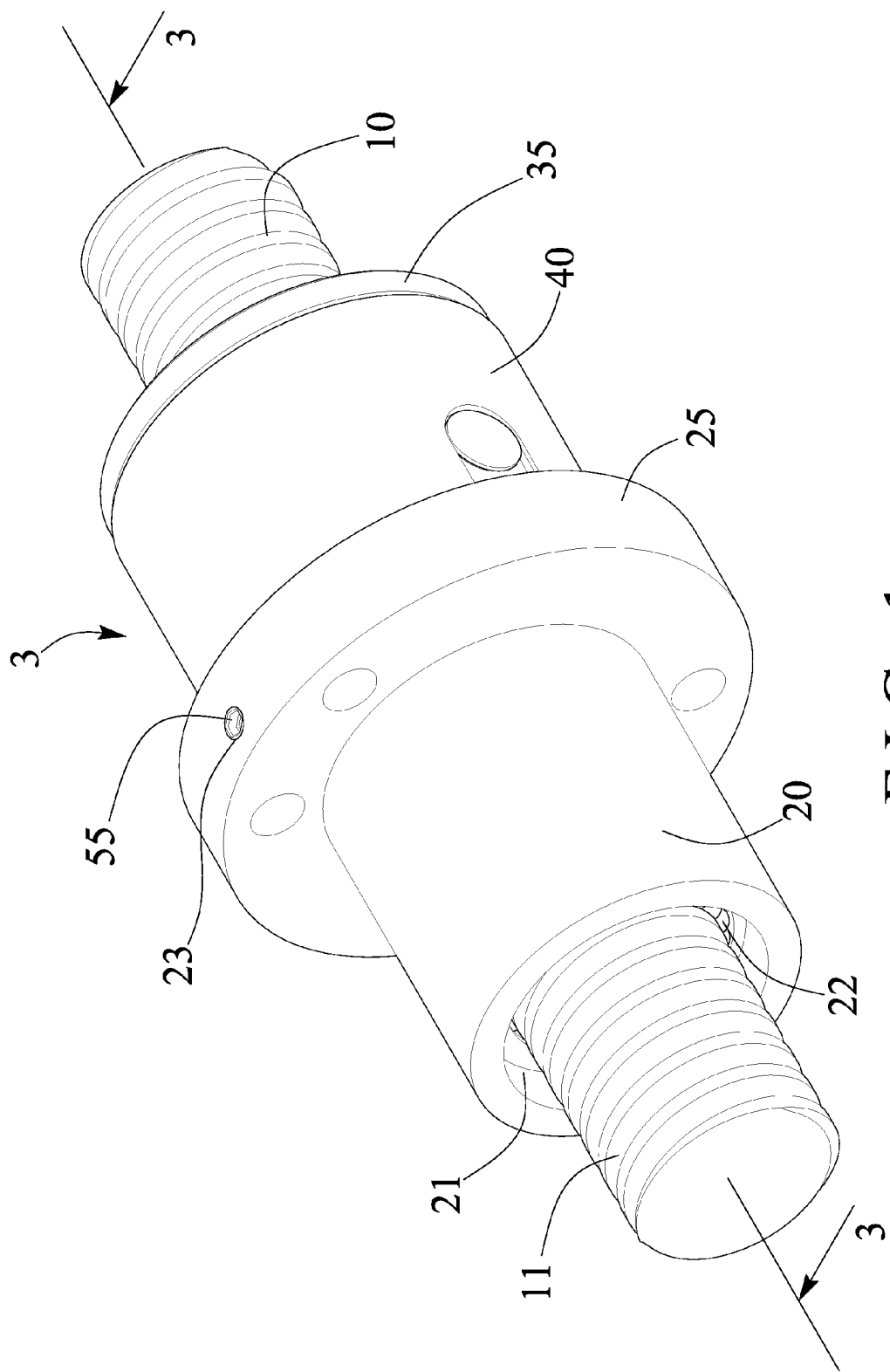
FIG. 1 is a perspective view of a ball screw device in accordance with the present invention.
Figure 2:
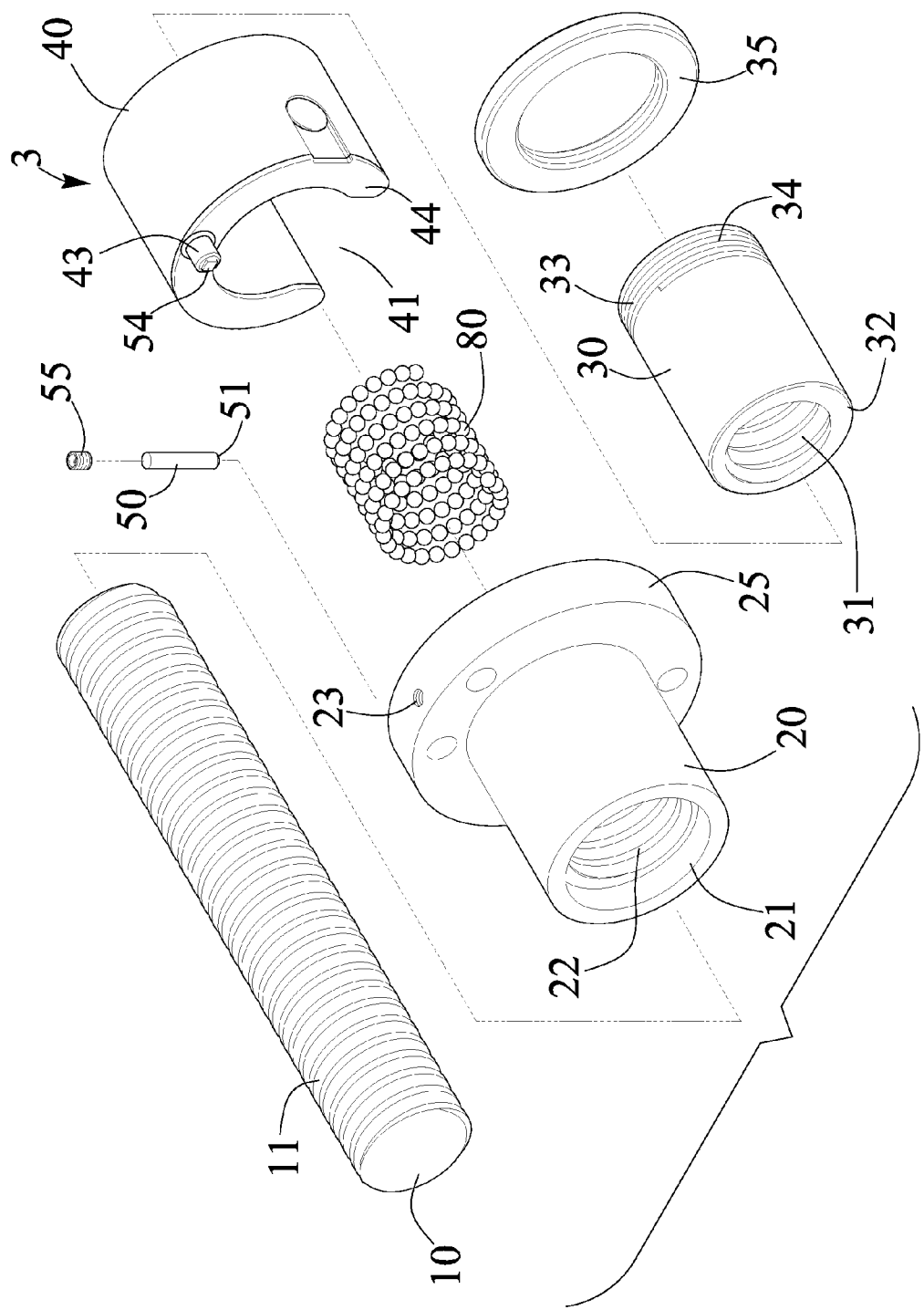
FIG. 2 is an exploded view of the ball screw device.
Figure 3:
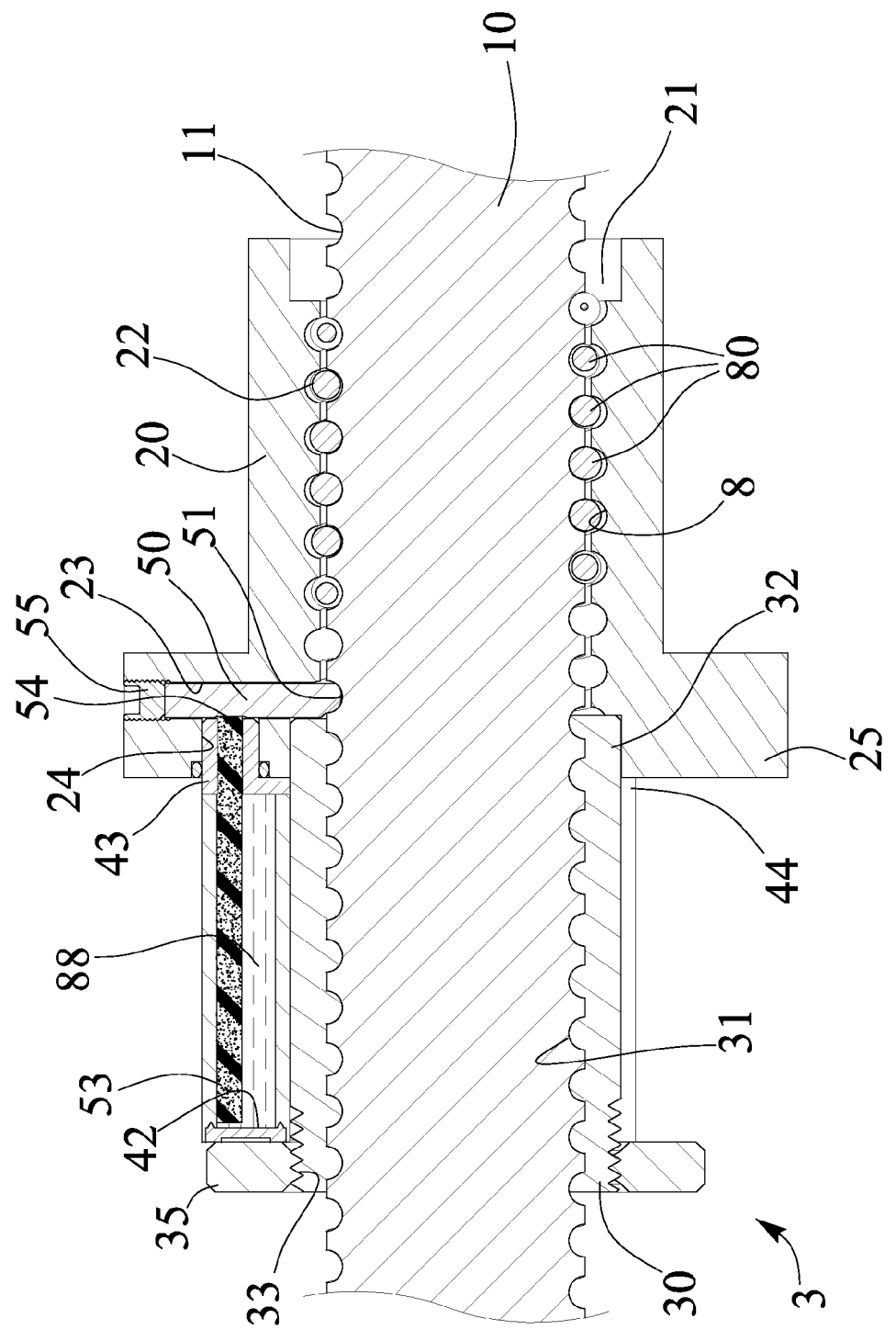
FIG. 3 is a cross sectional view of the ball screw device, taken along lines 3-3 of FIG. 1.
Figure 4:
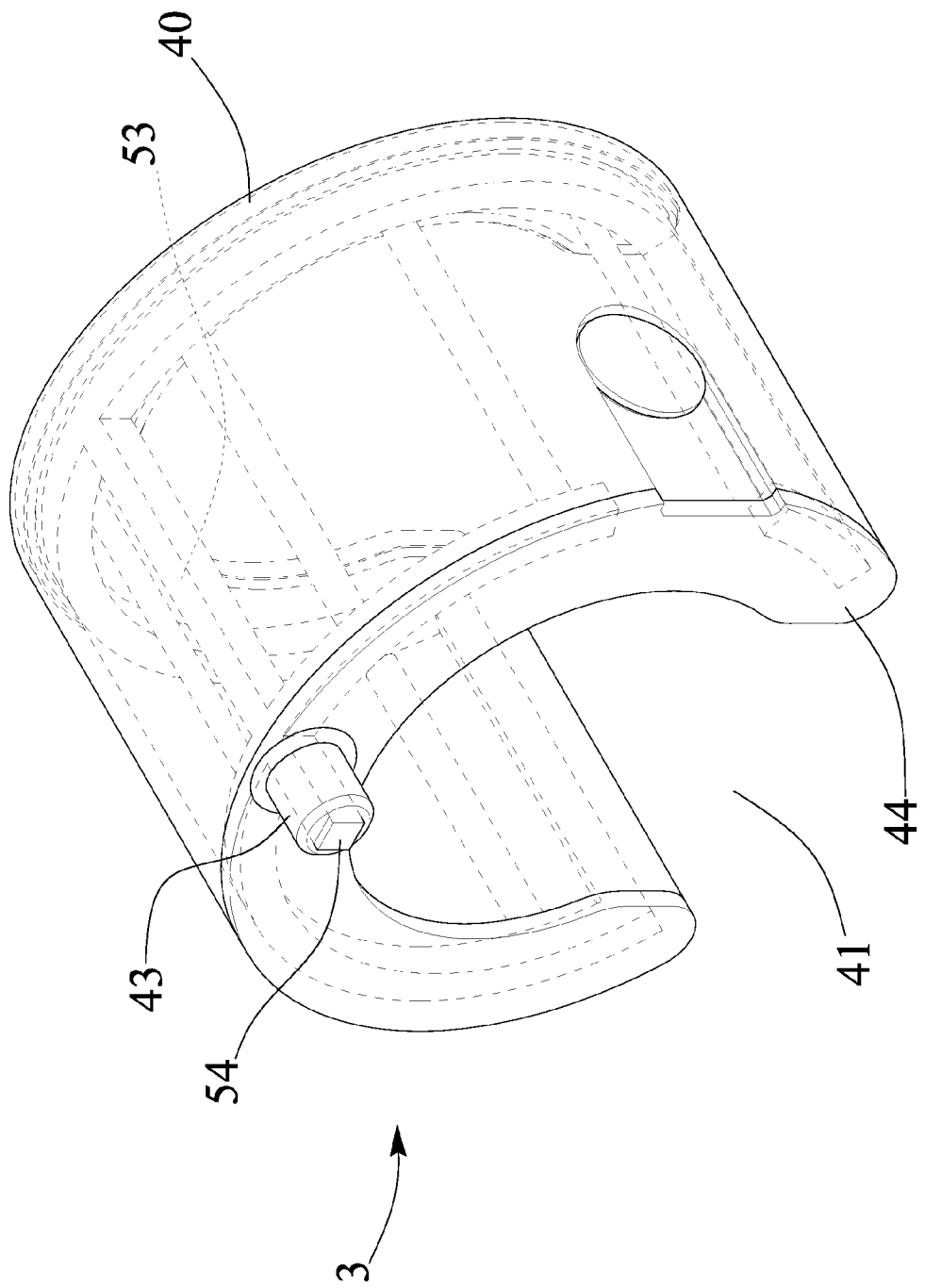
FIG. 4 is a perspective view illustrating one of the parts or elements of the ball screw device.

Referring to the drawings, and initially to FIGS. 1-3, a motion guide apparatus in accordance with the present invention, such as a ball screw device in accordance with the present invention comprises an elongated bolt or screw shaft 10 including a number of helical threaded portions or grooves 11 formed on the outer peripheral portion thereof, or formed in the outer peripheral surface thereof, and a movable member, such as a ball nut 20 including a screw hole 21 formed therein and formed or defined by a number of helical threaded portions or grooves 22 for receiving or engaging with the elongated elongated shaft 10, and for threading or engaging with the helical threaded portions or grooves 11 of the elongated shaft 10, and/or for forming one or more endless ball guiding passages 8 in the ball screw device or between the elongated shaft 10 and the ball nut 20 and for slidably receiving a number of ball bearing members 80. The above-described structure is typical and will not be described in further details.

The ball nut 20 further includes a conduit or passage 23 formed therein and communicating with the screw hole 21 of the ball nut 20 (FIG. 3), and further includes a hole or orifice 24 laterally formed therein, such as laterally formed in the one or first end portion 25 thereof and facing or opened and directed away from the ball nut 20 and communicating with the passage 23 of the ball nut 20 (FIG. 3). The ball screw device in accordance with the present invention further comprises a lubricating device 3 including an inner cylindrical barrel or element 30 having a bore 31 formed therein for receiving or engaging with the elongated elongated shaft 10, and the cylindrical element 30 includes one or first end portion 32 engaged into the first end portion 25 of the ball nut 20 and solidly and stably secured to the ball nut 20 and moved in concert with the ball nut 20 relative to the elongated shaft 10. The cylindrical element 30 further includes an outer thread 33 formed or provided on the other or second end portion 34 thereof for threading or engaging with a lock nut 35.

The lubricating device 3 further includes an outer housing 40 having a substantially cylindrical bore or opening 41 formed therein for receiving or engaging with the cylindrical element 30 and for preventing the housing 40 from being disengaged or separated from the cylindrical element 30, and the lock nut 35 is contacted or engaged with the housing 40 for solidly and stably anchoring or retaining the housing 40 between the first end portion 25 of the ball nut 20 and the lock nut 35, or for solidly attaching the housing 40 on the cylindrical element 30. The housing 40 is contacted with the first end portion 25 of the ball nut 20 and includes a compartment or chamber 42 formed therein (FIG. 3) for receiving or containing a lubricating grease 88 therein, and includes a stud or mouth piece 43 extended from the one or first end portion 44 thereof and engaged into the orifice 24 in the first end portion 25 of the ball nut 20 (FIG. 3) for further anchoring or retaining the housing 40 to the ball nut 20 and for preventing the housing 40 from pivoting or rotating relative to the ball nut 20.

The lubricating device 3 further includes an oil applying or distributing device or member 50 disposed or engaged into the passage 23 of the ball nut 20 (FIG. 3) and having one or first end portion 51 extended or engaged into the screw hole 21 of the ball nut 20 for engaging with the helical grooves 11 of the elongated shaft 10; and further includes an absorbing or outwardly supplying or inner directing element 53 disposed or engaged in the chamber 42 of the housing 40 for absorbing the lubricating grease 88, and the inner element 53 includes one or first end portion 54 engaged in or through the mouth piece 43 of the housing 40 and extended or engaged into the passage 23 of the ball nut 20 (FIG. 3) and contacted or engaged with the distributing member 50 for supplying the lubricating grease 88 to the distributing member 50, and then to the helical grooves 11 of the elongated shaft 10, and thus for supplying the lubricating grease 88 to lubricate the ball bearing members 80.

A lock device or fastener 55 may further be provided and threaded or engaged with the ball nut 20, and contacted or engaged with the distributing member 50 for solidly and stably anchoring or retaining the distributing member 50 within the passage 23 of the ball nut 20. The housing 40, at least the first end portion 44 of the housing 40 is made of heat conductable materials, such as copper or the like, and the first end portion 44 of the housing 40 is contacted or engaged with the ball nut 20 for absorbing the heat from the ball nut 20 and for allowing the lubricating grease 88 to be suitably heated and softened by the heat from the ball nut 20 and for allowing the lubricating grease 88 to become a fluid status, and thus for allowing the lubricating grease 88 to be suitably absorbed by the inner element 53 and then supplied to the distributing member 50.

In operation, as shown in FIG. 3, the lubricating grease 88 contained in the chamber 42 of the housing 40 may be hardened or solidified in the room temperature and thus may not be suitably absorbed by the inner element 53. When the ball nut 20 is moved relative to the elongated shaft 10, a heat may be generated between the elongated shaft 10 and the ball nut 20 and the ball bearing members 80 and the heat may be transmitted to the housing 40 in order to heat and soften the lubricating grease 88, and thus for allowing the lubricating grease 88 to be suitably absorbed by the inner element 53 and then supplied to the distributing member 50, and then to suitably lubricate the elongated shaft 10 and the ball nut 20 and the ball bearing members 80. After use, or when the ball nut 20 is not to be moved relative to the elongated shaft 10, the lubricating grease 88 will be hardened or solidified again in the room temperature.

The lubricating grease 88 is made of lubricating oil or materials, wax and the like, for example, the lubricating grease 88 includes about 5~30% weight of the wax, and about 70~95% weight of the lubricating oil, and it is preferable that the lubricating grease 88 includes 10% weight of the wax, and 90% weight of the lubricating oil, which may include an excellent solidifying condition. The lubricating oil may be selected from mineral oil, blended oil, thick oil or the like, for example, a mineral oil having a viscosity of 68 cst (VG68) is selected. The wax may be selected from paraffin, micro crystal wax or the like, for example, a refined wax: $CnH_{2n+2}$ is selected, wherein: "n"

is ranged between 20-55, and the molecular weight is ranged between 280-800. The wax may be heated and softened and mixed with the lubricating oil, and then stirred and/or blended to form the lubricating grease 88 after the mixed materials are cooled to the room temperature.

Accordingly, the ball screw device in accordance with the present invention includes a lubricating device attached to a movable nut member for applying a lubricating grease or oil onto the movable nut member and for suitably lubricating the movable nut member, and including a structure for suitably heating the lubricating grease or oil and for allowing the lubricating grease or oil to be easily filled or applied to the required position of the movable nut member.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A ball screw device comprising:

an elongated shaft including a groove formed on an outer peripheral surface thereof, a ball nut including a screw hole formed therein for receiving said elongated shaft, said ball nut including a passage formed therein and communicating with said screw hole of said ball nut, said ball nut including an orifice formed therein and communicating with said passage of said ball nut, and a lubricating device including:

an inner cylindrical element having a bore formed in said cylindrical element for receiving said elongated shaft, said cylindrical element including a first end portion secured to said ball nut and including a second end portion, a housing attached onto said cylindrical element and contacted with said ball nut, and said housing including a chamber formed therein for receiving a lubricating grease, and said housing including a mouth piece engaged into said orifice of said ball nut for anchoring said housing to said ball nut, a lock nut engaged onto said cylindrical element and engaged with said housing for anchoring said housing between said ball nut and said lock nut, an oil distributing member engaged into said passage of said ball nut and including a first end portion engaged into said screw hole of said ball nut for engaging with said groove of said elongated shaft, a fastener threaded with said ball nut and engaged with said distributing member for retaining said distributing member within said passage of said ball nut, an inner element engaged in said chamber of said housing for absorbing said lubricating grease, and said inner element including a first end portion engaged into said passage of said ball nut and engaged with said distributing member for supplying said lubricating grease to said distributing member, and then to said groove of said elongated shaft, said first end portion of said inner element being engaged through said mouth piece of said housing and engaged into said passage of said ball nut and contacted with said distributing member, and said lubricating grease including a wax of 5~30% by weight, and a lubricating oil of 70~95% by weight.

2. The ball screw device as claimed in claim 1, wherein said lubricating grease includes said wax of 10% by weight, and said lubricating oil of 90% by weight.

* * * * *